(12) United States Patent  (10) Patent No.: US 7,823,386 B2
Zimron et al.  (45) Date of Patent: *Nov. 2, 2010

(54) ORGANIC WORKING FLUIDS (75) Inventors: Ohad Zimron, Gan Yavne (IL); Lucien Y. Bronicki, Yavne (IL)

(73) Assignee: Ormat Technologies, Inc., Reno, NV (US)

(*) Notice: Subject to any disclaimer, the term of this patent is extended or adjusted under 35 U.S.C. 154(b) by 745 days.

This patent is subject to a terminal disclaimer.

(21) Appl. No.: 11/754,628

(22) Filed: May 29, 2007

(65) Prior Publication Data

US 2008/0060357 A1 Mar. 13, 2008

Related U.S. Application Data

(63) Continuation of application No. 11/067,710, filed on Mar. 1, 2005, now Pat. No. 7,225,621.

(51) Int. Cl.
F01K 25/08 (2006.01)

(52) U.S. Cl. .......................... 60/651; 60/671

(58) Field of Classification Search .................. 60/649, 60/651, 670, 671

See application file for complete search history.

(56) References Cited

U.S. PATENT DOCUMENTS

| 2,404,927 A | 7/1946 | Schmerling et al. |
| 3,040,528 A | 6/1962 | Tabor et al. |
| 3,648,456 A | 3/1972 | Bechtold et al. |
| 3,865,896 A | 2/1975 | McCoy et al. |

(Continued)

OTHER PUBLICATIONS

N. S. Christopher, et al., "Closed Cycle Vapor Turbogenerator—A Reliable Remote Prime Power Source", International Telecommunications Energy Conference, 2 cover pages and pp. 443-449 (Oct. 1982).

(Continued)

*Primary Examiner*—Hoang M Nguyen
(74) *Attorney, Agent, or Firm*—Oblon, Spivak, McClelland, Maier & Neustadt, L.L.P.

(57) ABSTRACT

The present invention provides an improved, commercially available organic working fluid, which is operable under a broad range of temperatures, is thermally stable, has a high auto-ignition temperature, low freezing point and high critical temperature and is benign to the environment, and safe for human use. Such an organic working fluid is useful in organic Rankine cycle (ORC) power plants or units and other systems of the like as an intermediate fluid for heat-recovery wherein heat from various heat sources is transferred using the intermediate fluid to a further working fluid and converted into work, and the intermediate fluid is also exploited to produce electricity. Such organic working fluids are also operable as heat transfer fluids either in ORC power plants or units or in other heat transfer systems. For this purpose the present invention presents a working fluid comprising at least one highly branched, heavy iso-paraffin hydrocarbons, or a mixture of two or more of such hydrocarbons. Preferably, at least one highly branched iso-paraffin hydrocarbon is present as the major component (i.e. at least 50°% by volume) in the working fluid. A preferred subclass of the class of the branched iso-paraffins which are suitable to be incorporated in organic working fluids of the present invention includes 8 to 20 carbon atom-containing hydrocarbons having at least one methyl radical ($CH_3$) arranged to achieve a highly stable compound.

29 Claims, 3 Drawing Sheets

U.S. PATENT DOCUMENTS

| | | | |
|---|---|---|---|
| 4,760,705 | A | 8/1988 | Yogev et al. |
| 6,518,321 | B1 | 2/2003 | O'Rear et al. |
| 6,571,548 | B1 | 6/2003 | Bronicki et al. |
| 6,598,397 | B2 | 7/2003 | Hanna et al. |
| 6,806,087 | B2 | 10/2004 | Kibby et al. |
| 6,960,839 | B2 | 11/2005 | Zimron et al. |
| 6,977,225 | B2 | 12/2005 | Iyer et al. |
| 7,225,621 | B2 * | 6/2007 | Zimron et al. ............... 60/651 |
| 2005/0109387 | A1 | 5/2005 | Marshall |

OTHER PUBLICATIONS

D. Tracy, "Considerations for evaluating, maintaining pipe line coatings", Pipe Line and Gas Industry (Aug. 1997).
W. Frichtl, "Two Decades of Security Along TransAlaska Pipeline", Pipeline and Gas Journal, 4 pages (Jul. 1997).
U.S. Appl. No. 12/045,454, filed Mar. 10, 2008, Batscha, et al.

* cited by examiner

ORGANIC WORKING FLUIDS

This is a continuation application of U.S. application Ser. No. 11/067,710, filed Mar. 1, 2005.

BACKGROUND OF THE INVENTION

1. Field of the Invention

The present invention relates to organic fluids, and more particularly to organic fluids for use as the working fluid in high-temperature Organic Rankine Cycle (ORC) applications and as the heat transfer fluid in heat transfer cycles for a range of low and high temperatures.

2. Background

High-temperature organic working fluids have been introduced as the working fluids in power plants and as working; and heat transfer intermediates in order to overcome the shortcomings of the use of the water steam medium used for heat transfer or for waste heat recovery and power generation. Heat-energy converters, based on the thermodynamic Organic Rankine Cycle, or similar beat-energy transfer systems, are useful in heat recovery and power generation in particular in remote locations, where the heat is derived from various sources, such as gas turbine exhaust gases, combustion of conventional fuels, combustion of biomass fuels, geothermal sources, solar heat collects and waste heat in power plants and other industrial processes, for the purpose of producing electrical power in the range of from a hundred or mace Watts (W) and up to a few of tens Megawatts (MW). Organic fluids sustainable at temperatures as high as about 350° C. are advantageous over water—steam, and can be successfully utilized in power generation cycles even at low condensing temperatures and high turbine expansion ratios where the use of steam may be limited due to formation of liquid droplets at the turbine outlet due to the expansion of the steam which may cause erosion to the turbine blades. Because of the nature of the organic fluids they become superheated (or dry) in the expansion process a characteristic which prevents the formation of liquid droplets as is the case with steam. Organic fluids and their derivatives operable under a range of relatively low temperatures normally up to about 20000 are CFCs, Freon, butane including n-butane and iso-butane, and pentane, also including the n-pentane and iso-pentane isomers. For applications where higher operating temperatures are required a transition was required to aromatic hydrocarbons, alkylated aromatic hydrocarbons, fluorinated hydrocarbons such as F75 and F43 and silicone based oils. Examples for alkylated aromatic hydrocarbons are commercial Dowtherm J, which is a mixture of isomers of alkylated aromatic hydrocarbon manufactured by the Dow Chemical Company and Therminol LT, an alkyl substituted aromatic hydrocarbon, manufactured by the Solutia Inc.

The use of the above-mentioned working fluids does have, however, several drawbacks. First, fluids such as F75 or F43 are expensive. Second, such working fluids require periodic treatment and recycling. Third, they limit operating temperatures resulting in lower efficiency.

There is, therefore, a need for a stable, commercially available organic compound, which can be operated in its liquid and vapor states in a wide range of temperatures, thus successfully inhibiting improved performance as a working fluid or thermal fluid for either power or electricity generating cycles, or heat transfer cycles.

It is therefore an object of the present invention to provide a highly thermally stable fluid useful as a working fluid for power or electricity generating cycles or as a heat transfer fluid for heat transfer cycles, or both.

It is another object of the present invention to provide a working fluid that has a high critical temperature and relatively low pressures at elevated temperatures.

It is another object of the present invention to provide a working fluid that has a high auto-ignition temperature.

It is another object of the present invention to provide a working fluid that has a low freezing or solidification temperature.

It is still another object of the present invention to provide a working fluid that is benign to humans and to the environment.

It is still another object of the present invention to provide a working fluid that can be easily obtainable by those in the art.

It is still another object of the present invention to provide a working fluid that is operable in a wide range of temperatures.

It is still another object of the present invention to provide a working fluid for use in an organic Rankine cycle for electricity or power production in beat recovery applications or other heat-energy conversion cycles, and/or as a heat transfer fluid in heat transfer cycles.

It is still another object of the present invention to provide a use of such a working fluid for heat and waste heat recovery from various heat sources for electricity or power generation and/or other usage of the heat.

These and other objects of the present invention will become clear as the description proceeds.

SUMMARY OF THE INVENTION

The present invention provides an improved, commercially available organic working fluid, which is operable under a broad range of temperatures, is thermally stable, has a high auto-ignition temperature, low freezing point and high critical temperature. Such an organic working fluid is useful in organic Rankine cycle (ORC) power plants or units and other systems of the like as an intermediate fluid for heat-recovery wherein heat from various heat sources is transferred using the intermediate fluid to a further working fluid and converted into work, and the intermediate fluid is also exploited to produce electricity. Such organic working fluids are also operable as heat transfer fluids either in ORC power plants or units or in other heat transfer systems.

For this purpose the present invention presents a working fluid comprising at least one highly branched, heavy iso-paraffin hydrocarbons, or a mixture of two or more of such hydrocarbons. Preferably at least one highly branched iso-paraffin hydrocarbon is present as the major component (i.e. at least 50% by volume) in the working fluid. The high thermal stability of such hydrocarbons is provided this to the location of the methyl radical ($CH_8$) arranged to achieve highly stable compounds. Such highly branched heavy iso-paraffin hydrocarbons or organic fluids have high boiling point temperatures as well as high auto-ignition temperatures, and low freezing point temperatures. They exhibit high thermal stability, and in addition are benign to the environment, and safe for human use. Their high critical temperatures enables operation at high temperatures yet below the critical temperature, by doing so achieving high cycle efficiency without the complexity associated with operation above the critical point and at high pressure. Another advantage is their commercial availability, enabling, through their use, cost effective electricity or power production from various heat sources, or heat transfer in power plants or in other uses.

A preferred sub-class of the class of the branched iso-paraffins which are suitable to be incorporated in organic working fluids of the present invention includes 8 to 20 carbon atom-containing hydrocarbons having at least one methyl radical (CH$_8$) arranged to achieve a highly stable compound. Preferably, the branched iso-parrafins are highly branched; meaning that they have 3-20 methyl groups attached to tertiary or quaternary carbon atoms. As used herein, "substantially branched" means at least 8 branched (i.e. non-end groups) methyl groups. Such iso-paraffins, or a mixture of two or more of them, are used according to the present invention as the major component in working fluids in power plants operating according to an Organic Rankine Cycle (ORC), or in any other high temperature heat recovery system, or as thermal fluids in heat transfer cycles.

Thus, an example of the use of the working fluids of the present invention can be their use, according to the present invention, in a heat recovery system including a highly thermally stable working fluid, wherein the improvement comprises a highly thermally stable working fluid suitable for operating in the range of about −50° C. up to 350° C., comprising as the major component at least one compound of formula (I):

$$C_nH_{2n+2} \quad (I)$$

wherein n is between 8 and 20, and wherein the compounds of formula (I) are substantially branched.

Preferably, the above-mentioned working fluid comprises at least one compound in which part or all the methyl groups present in said compound are substituted with one or more halogens or halogen containing substituents, wherein the halogens are selected from the group consisting fluorine, chlorine, or bromine.

Also preferably, the working fluid mentioned above further comprises an additive selected from the group consisting of fire-retardant agents, flow aids, corrosion inhibitors, lubricants, anti-freezing agents, anti-oxidants, and process oils and mixtures there, In addition, preferably, the working fluid mentioned above comprises an iso-parrafin selected from the group consisting of iso-dodecane or 2,2,4,6,6-pentamethylheptane, iso-eicosane or 2,2,4,4,6,6,8,10,10-nonamethylundecane, iso-hexadecane or 2,2,4,4,6,8,8-heptamethylnonane, octane or 2,2,4 trimethylpentane, iso-nonane or 2,2,4,4 tetramethylpentane and a mixture of two or more of these compounds. Another example of the use of the working fluids of the present invention can be their use, according to the present invention, in a heat transfer cycle including a highly thermally stable working fluid, wherein the improvement comprises a highly thermally stable working fluid suitable for operating in the range of about −50° C. up to 350° C., comprising as the major component at least one compound of formula (I):

$$C_nH_{2n+2} \quad (I)$$

wherein n is between 8 and 20, and wherein the compounds of formula (I) are substantially branched.

Preferably, the working fluid mentioned above comprises at least one compound in which part or all the methyl groups present in said compound are substituted with one or more halogens or halogen containing substituents, wherein said halogens aria selected from the group consisting fluorine, chlorine, or bromine.

Also preferably, the working fluid mentioned above further comprises an additive selected from the group consisting of fire-retardant agents, flow aids, corrosion inhibitors, lubricants, anti-freezing agents, anti-oxidants, and process oils and mixtures thereof.

In addition, preferably, the working fluid mentioned above comprises an iso-paraffin selected from the group consisting of iso-dodecane or 2,2,4,6,6-pentamethylheptane, iso-eicosene or 2,2,4,4,6,8,8,10,10-nonamethylundecane, iso-hexadecane or 2,2,4,4,6,8,8, heptamethylnonans, isooctane or 2,2,4 trimethylpentans, iso-nonane or 2,2,4,4 tetramethylpentane and a mixture of two or more of stud compounds.

BRIEF DESCRIPTION OF THE DRAWINGS

A description of the present inventive subject matter including embodiments thereof is presented and with reference to the accompanying drawings, the description not meaning to be considered limiting in any manner, wherein.

DETAILED DESCRIPTION

According to the present invention, an improved, commercially available organic working fluid is provided, which is operable under a broad range of temperatures, is thermally stable, has high critical temperature, low freezing or solidification temperature and has a high auto-ignition temperature. Such an organic working fluid is useful in Organic Rankine Cycle (ORC) power plants or units and other systems of the like; as an intermediate fluid for heat-recovery, wherein heat from various heat sources is transferred using the intermediate fluid to a further working fluid and converted into work, and the intermediate fluid is also exploited to produce electricity. Such working fluids are also operable as heat transfer fluids either in ORC power plants or units or in other heat transfer systems.

For this purpose the present invention presents a working fluid comprising at least one highly branched, heavy iso-paraffin hydrocarbon, or a mixture of two or more of such hydrocarbons. Preferably at least one highly branched iso-paraffin hydrocarbon is present as the major component (i.e. at least 50% by volume) in the working fluid. The high thermal stability of such hydrocarbons is provided due to the location of the methyl radical (CH$_3$) arranged to achieve highly stable compounds. Such highly branched heavy iso-paraffin hydrocarbons or organic fluids have high boiling point temperatures as well as high auto-ignition temperatures, and low freezing point temperatures. They exhibit high thermal stability, and in addition are benign to the environment, and safe for human use. Another advantage is their commercial availability, enabling, through their use, cost effective electricity or power production from various heat sources, or heat transfer in power plants or in other uses.

U.S. Pat. No. 5,612,888 discloses, inter alia, the use of isoparaffins as non-Newtonian liquid bearing materials as support for head components of a head-disk assembly over rigid disks. Such application of liquid iso paraffins is confined to a narrow temperature range set by the temperature operation limits of the disk drives, which may be for example between 5° C. and 55° C.

A preferred sub-class of the class of the branched iso-paraffins which are suitable to be incorporated in organic working fluids of the present invention includes 8 to 20 carbon atom-containing hydrocarbons having at least one methyl radical (CH$_3$) arranged to achieve a highly stable compound. Preferably, the branched iso-paraffins are highly branched, meaning that they have 8-20 methyl groups attached to tertiary or quaternary carbon atoms. As used herein, "substantially branched" means at least 8 branched (i.e. non-end groups) methyl groups. Such iso-paraffins, or a mixture of two or more or them, are used according to the present invention as the major component in working fluids in power plants operating according to an Organic Rankine Cycle (ORC), or in any other high temperature heat recovery system, or as thermal fluids in heat transfer cycles.

Preferred operating temperatures of the working fluids in the power plant or heat transfer cycle are in the range of about –50° C. up to about 350° C. Besides exhibiting thermal stability in this temperature range, such a wide range of operating temperatures results in improved efficiency for the heat recovery in power plants or of heat transfer in heat transfer systems.

The branched iso-paraffins disclosed in the present invention are optionally modified to acquire fire-retarding characteristics by substituting all or some of the methyl groups with one or more substitutents, including for example substituents such as halogens, including fluorine, chlorine, and bromine, or halogen containing substitutents.

Preferred iso-paraffin hydrocarbons of the present invention are the compounds according to formula (I):

$$C_nH_{2n+2} \qquad (I)$$

where n is between 8 and 20.

The working fluids of the present invention may comprise in addition conventional additives, where such additives may be selected from fire-retardant agents, flow aids, corrosion inhibitors, lubricants, anti-freezing agents, antioxidants, and process oils and mixtures thereof.

In one preferred embodiment of the present invention the branched iso-paraffin organic working fluid is, or comprises, iso-dodecane or 2,2,4,6,6-pentamethylheptane.

In a second preferred embodiment of the present invention the branched iso-paraffin organic working fluid is, or comprises, iso-eicosane or 2,2,4,4,6,6,8,10,10-nonamethylundecane.

In a third preferred embodiment of the present invention the branched iso-paraffin organic working fluid is iso-hexadecane or 2,2,4,4,6,8,8-heptamethylnonane.

In a fourth preferred embodiment of the present invention the branched iso-paraffin organic working fluid is isooctane or 2,2,4 trimethylpentane.

In a fifth preferred embodiment of the present invention the branched iso-paraffin organic working fluid is iso-nonane or 2,2,4,4 tetramethylpentans.

All of the compounds disclosed herein above are useful as major components in organic working fluids in power plants employing the Rankine cycle or similar systems for heat or waste heat recovery, or in heat transfer cycles, and are thermally stable in a wide temperature range of about –50° C. up to about 350° C.

Figure 1:
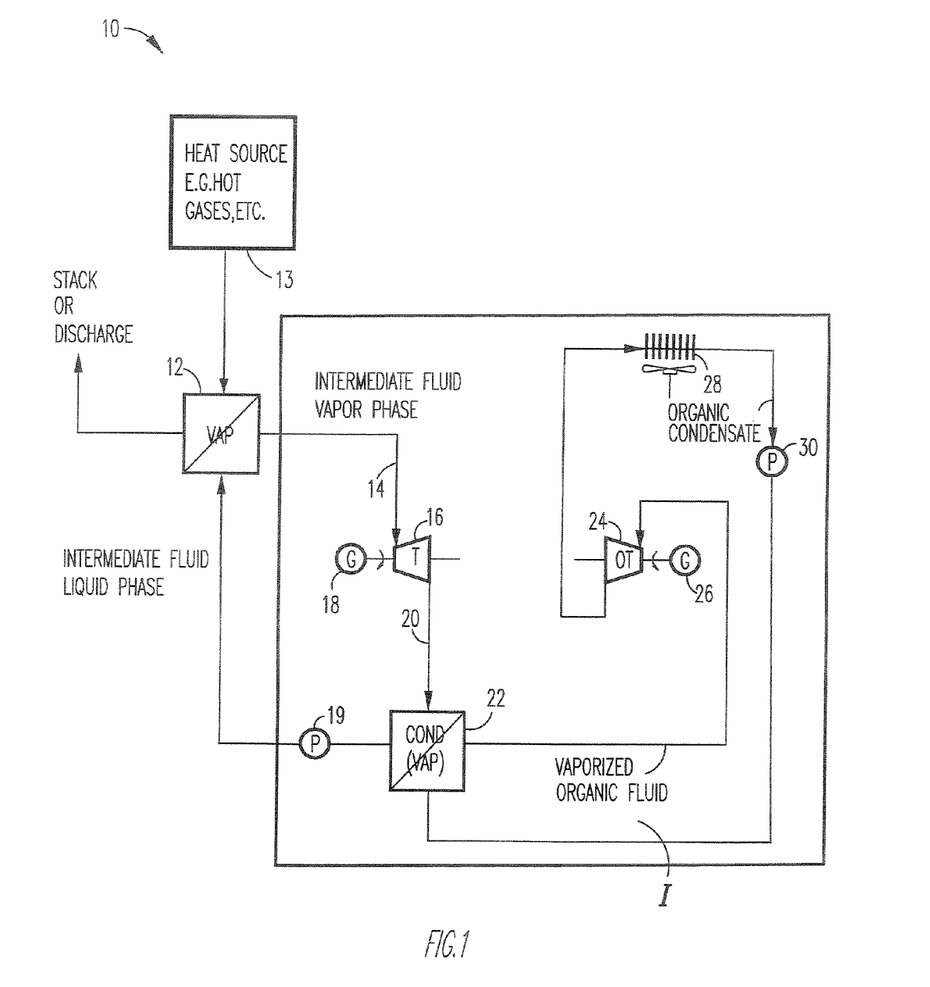
FIG. 1 shows an embodiment of a power plant in which the working fluids of the present invention can be used.

Non-limitative examples of energy recoveries or heat transfer systems and methods of producing power therefrom, that may employ the organic iso-paraffin fluids of the present invention, are referred to below:

As an example of an embodiment of a system in which the present invention can be used reference is now made to FIG. 1, and reference numeral 10 designates an embodiment of apparatus for producing power in accordance with the present invention. As can be seen from the drawing, the apparatus comprises intermediate fluid heater/vaporizer 12 by which vaporized intermediate fluid is produced using heat from heat source 13 e.g. using heat contained in hot gases, etc. The vaporized intermediate fluid is supplied to organic working fluid vaporizer 22 where it is condensed by transferring heat to organic fluid present in the vaporizer so that vaporized organic fluid is produced. Intermediate fluid condensate produced is returned to intermediate fluid heater/vaporizer 12 using pump 19. The vaporized organic fluid is supplied to organic vapor turbine 24 wherein it expands and produces power. Preferably, generator 26 is driven by organic vapor turbine 24 and produces electricity. Expanded vaporized organic fluid exiting organic vapor turbine 24 is supplied to organic fluid condenser 28 and organic fluid condensate is produced. Pump 30 supplies organic fluid condensate exiting organic fluid condenser 28 to organic working fluid vaporizer 22. In accordance with the present invention, prior to supplying vaporized intermediate fluid exiting intermediate fluid vaporizer 12 to organic working fluid vaporizer 22, the vaporized intermediate fluid is supplied to intermediate fluid turbine 16 wherein the vaporized intermediate fluid expands and produces power. Also here, preferably, intermediate fluid turbine 16 drives generator 18 that produces electricity.

In operation, intermediate fluid present in intermediate fluid vaporizer 12 extracts heat from heat source 13 e.g. hot gases and intermediate fluid vapor is produced. The intermediate fluid vapor is supplied preferably to intermediate fluid turbine 16 and expands therein producing power and expanded intermediate fluid vapor exits intermediate fluid turbine 16. Since preferably, generator 18 is coupled to intermediate fluid turbine 16 electricity is produced. Expanded intermediate fluid vapor exiting intermediate fluid turbine 16 is supplied via line or conduit 20 to organic working fluid vaporizer 22. Organic working fluid present in organic working fluid vaporizer 22 extracts heat from the expanded intermediate fluid vapor and intermediate fluid condensate as well as vaporized organic working fluid is produced. Intermediate fluid condensate is supplied using pump 19 to intermediate fluid vaporizer 12. Vaporized organic working fluid is supplied to organic working fluid turbine 24 wherein it expands and power is produced. Expanded organic working fluid vapor exits organic working fluid turbine 24. Preferably, organic working fluid turbine 24 is coupled to generator 26 and electricity is produced. The expanded organic working fluid vapor is supplied to organic working fluid condenser 28 that is preferably air-cooled and organic working fluid condensate is produced. Pump 30 supplies organic working fluid condensate to organic working fluid vaporizer 22.

The intermediate fluid mentioned in the embodiment described above can be the organic working fluids of the present invention disclosed herein. The preferred intermediate fluid is advantageous since their use avoids problems of freezing, operates without being at vacuum conditions and there is no need for chemical treatment and blow down as is usually the case with water when used as an intermediate fluid. Preferably, the intermediate fluid is useful in a relative high temperature range: vaporizing temperature between about 250° C. and about 315° C. At these temperatures, the pressure of the intermediate fluid is between about 9 kPa and 2600 kPa. The relatively low pressures mentioned above make this type of fluid particularly suitable for use in the present invention. Often, the condensing temperature of the intermediate fluid on the intermediate fluid side of organic working fluid vaporizer 22 will preferably be in the range of about 200° C. to about 120° C. but can be much lower if need be. Furthermore, the use of this type of intermediate fluid as a heat transfer medium for transferring heat from the heat source to the organic working fluid and as well as producing power from the intermediate fluid increases the efficiency of the power producing system on a whole. Preferably, the organic working fluid comprises pentane, either n-pentane or iso-pentane, n-butane, iso-butane as well as additional fluids such as hydrocarbons, for example aliphatic paraffins in their normal and isomeric form.

Furthermore, if preferred organic fluid power cycle I can include a pro-heater, superheater and recuperator. In addition, if preferred, generators 18 and 26 can be replaced by a single common generator driven by turbines 16 and 24 either using dual shaft ends in the single common generator or through a gear drive. Most preferred, the common generator is interposed between turbines 16 and 24.

Figure 2:
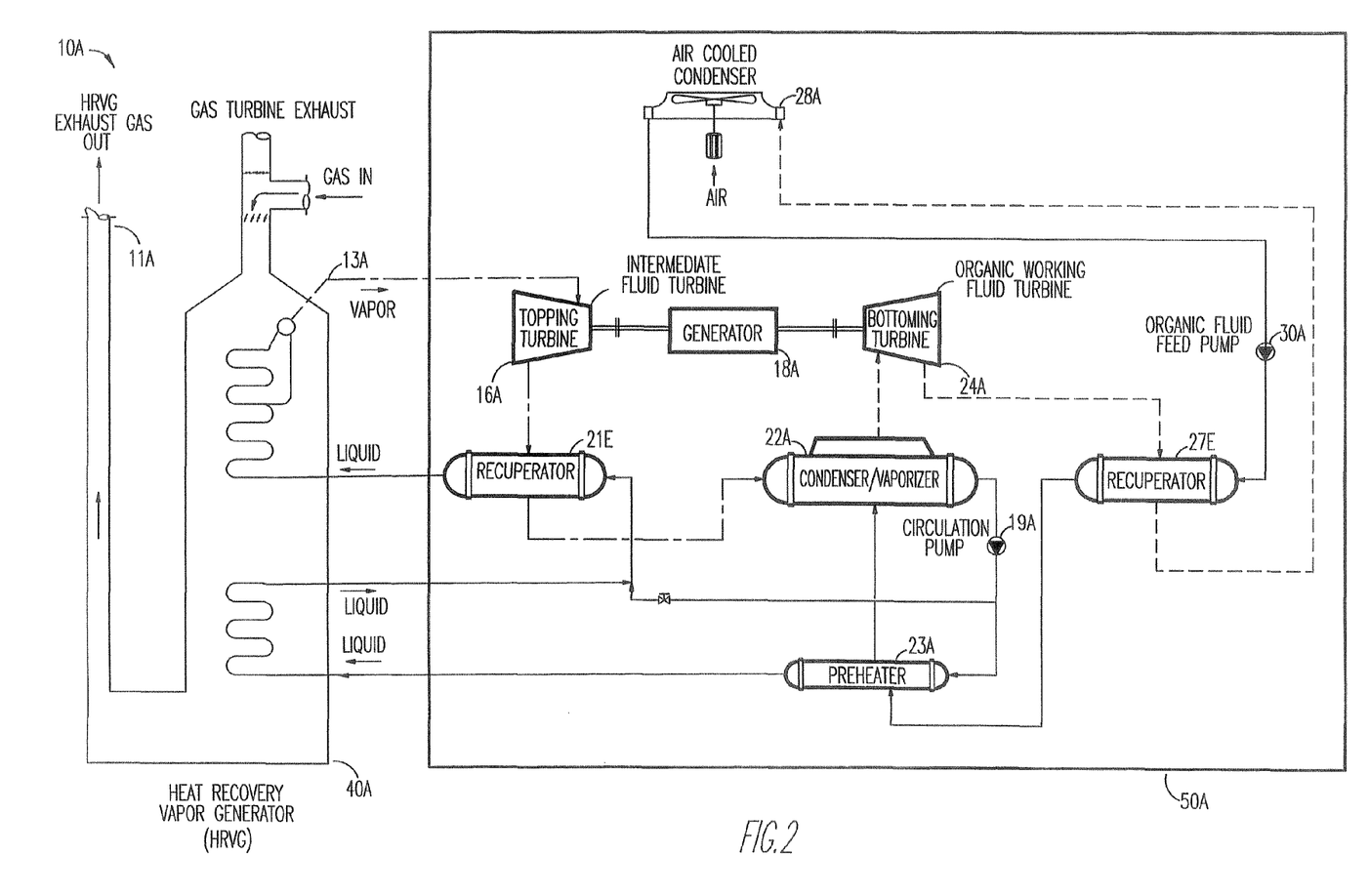
FIG. 2 shows a further embodiment of a power plant in which the working fluids of the present invention can also be used.

Referring now to FIG. 2, numeral 10A refers to a further embodiment of an example of a system or cycle in which the organic working fluid of the present invention is used and which includes, as shown, a recuperator in the intermediate fluid. As can be seen from the figure, intermediate fluid vapor produced by intermediate vaporizer present in heat recovery vapor generator 40A is supplied to vapor turbine 16A for producing power or electricity using generator 18A. Numeral 21A designates an intermediate fluid recuperator in which heat to transferred from expanded intermediate fluid vapor exiting intermediate fluid turbine 16A to intermediate fluid condensate supplied by pump 19A from the intermediate fluid side of organic working fluid vaporizer 22A. In this embodiment, portion of the intermediate fluid condensate exiting the intermediate fluid side of organic working fluid vaporizer 22A is supplied to organic fluid pre-heater 23A for pre-heating the organic working fluid prior to supplying it to organic working fluid vaporizer 22A. A further portion of the intermediate fluid condensate exiting the intermediate fluid side of organic working fluid vaporizer 22A is supplied to intermediate fluid recuperator 21A. In the present embodiment, heat from heat source 18A is added to the intermediate fluid condensate exiting organic pre-heater 28A. In addition, in this embodiment organic working fluid recuperator 27A is included and is used for transferring heat from expanded organic working fluid vapor exiting organic working fluid turbine 24A to organic working fluid condensate supplied by pump 30A from organic working fluid condenser 28A. Heated organic working fluid condensate exiting organic working fluid recuperator 27A is supplied to organic working fluid pre-heater 28A. Apart from these items previously mentioned with reference to the present embodiment described with relation to FIG. 2, this embodiment is similar to the embodiment described with relation to FIG. 1 and also operates in a similar manner.

In certain circumstances, all of the intermediate fluid exiting the intermediate fluid side of the organic working fluid vaporizer 22A can be supplied to organic working fluid pre-heater 28A. Thereafter, the cooled intermediate fluid exiting to organic working fluid pre-heater 28A can be supplied to heat source 184 the heated intermediate fluid exiting heat source 13A being supplied to intermediate fluid recuperator 21A.

In FIG. 2, generator 18A is preferably shared by the output of intermediate turbine 16A and organic working fluid turbine 24A. This is because intermediate turbine 16A can operate efficiently at relatively low rotational speeds (1500-1800 RPM, permitting it to be directly coupled to generator 18A whose rotational speed also is relatively low (1500-1800 RPM). Similarly, the rotational speed of organic working fluid turbine 24A can also be relatively low (1500-1800 RPM, permitting it also to be directly coupled to generator 18E. Thus generator 18A is interposed between intermediate turbine 16A and organic working fluid turbine 24A. However, if preferred, separate generators can be provided.

Furthermore, preferably, the embodiment described with reference to FIG. 2 comprises two separate entities, heat source unit or heat recovery vapor generator 40A and power cycle unit 50A.

As mentioned above, the intermediate fluid of the embodiment shown in FIG. 2 can be the organic working of the present invention.

It is to be pointed out that the intermediate fluid specified above can be used for all the embodiments mentioned herein.

Examples of heat sources from which the present invention can extract heat from are waste heat from gas turbines, waste heat from other industrial processes, waste heat produced in cement manufacture and in the cement manufacturing industry, heat produced by the combustion of conventional fuels, heat produced by the combustion of biomass fuel, geothermal resources including geothermal steam and geothermal liquid, solar energy, etc. In addition, the present invention can be used e.g. for producing electrical power in the range of from about a hundred or more Watts (W) up to a few tens of Megawatts (M %)

Furthermore, while this specification refers to the heat transfer cycle as using an intermediate fluid, it is possible to consider, in accordance with the present invention, the cycle using the intermediate fluid, when referring to power production, as a topping cycle with the organic working fluid cycle as a bottoming cycle, Moreover, while the embodiments of the present invention describe the use of generators 18 and 26 or the use of a common generator for producing electricity, in accordance with the present invention, the power produced by turbines 16 and 24 or either of them can be used as mechanical power. Thus, for example, they can run a compressor, other loads, etc.

Also in this embodiment, the intermediate fluid can be the organic working fluids of the present invention disclosed herein.

Furthermore, it is to be pointed out that while the intermediate fluid specified above is described as operating in a cycle wherein the intermediate fluid transfers heat from the heat source to a further organic working fluid, the organic working fluid of the present invention can be used in accordance with the present invention in such a power cycle wherein the intermediate fluid is used in a power cycle without transferring heat to a further organic working fluid.

Figure 3:
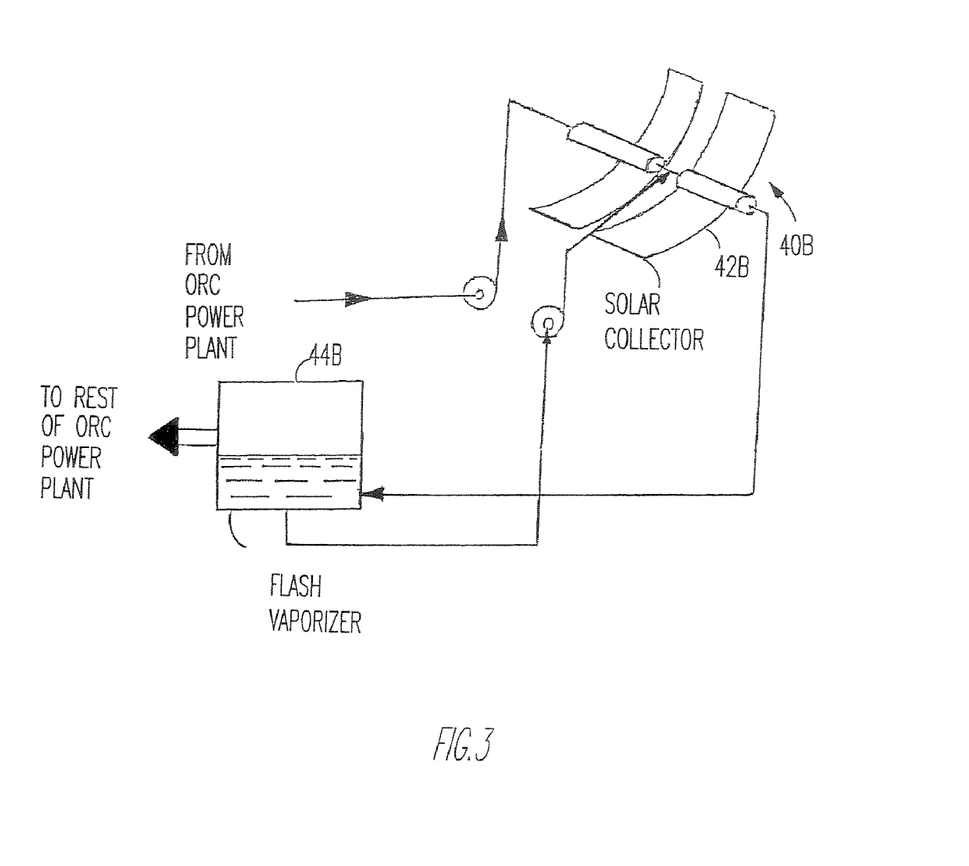
FIG. 3 shows an embodiment of a portion of a power plant in which the working fluids of the present invention can be used.

In a further preferred embodiment of the present invention, the organic working fluids of the present invention may be used for producing power or electricity from a heat source such as solar energy wherein the organic fluids disclosed in the present invention may be used in a power plant operating according to the organic Rankine cycle (see FIG. 3). In such a case, these organic working fluids are heated preferably in solar collector 40B such as a solar trough collector 42B and then supplied to a flash chamber, tank or vaporizer 44B for producing organic vapor which is supplied to a vapor turbine of an organic Rankine cycle (ORC) power plant for producing power or electricity. Liquid working fluid from the flash tank is not flashed is recycled to solar collector 40B either to the inlet of a single solar collector (not shown) or to the inlet of the second solar collector of a pair of serially connected solar collectors. Thereafter, the expanded organic working fluid is condensed in a condenser and the organic working fluid condensate is returned from the organic Rankine cycle (ORC) power plant to the solar collector.

Further non-limitative examples of energy or heat recovering or heat transfer systems and methods of producing power therefrom, that may employ the organic iso-paraffin fluids of the present invention, disclosed in several former publications, are all incorporated herein by reference.

In one preferred embodiment of the present invention the organic iso-paraffin fluids may be employed in vapor turbines and in a method for the operation of vapor turbines thereof, applying a heat recuperator in ORC power plants or units, as disclosed in U.S. Pat. No. 8,040,528.

In a second preferred embodiment of the present invention the same organic fluids may be employed in power plants applying cascaded vapor turbines and in a method thereof as disclosed in EP 1174 590 preferably using the same organic fluid as the intermediate fluid. In such systems and methods thereof a vaporized intermediate, as for example an organic, alkylated heat transfer fluid, preferably a synthetic alkylated aromatic heat transfer fluid, is used as the primary recipient of heat from the heat source, transferring it afterwards to the organic fluid.

In a third preferred embodiment of the present invention, as disclosed in U.S. Pat. No. 4,760,705, the organic fluids of the present invention may be employed as the working fluid or intermediate working fluid in Rankine cycle power plant disclosed therein wherein in this patent an improved working fluid useful in power plants selected from the group consisting bicyclic aromatic hydrocarbons, substituted bicyclic aromatic hydrocarbons, heterocyclic bicyclic aromatic hydrocarbons, substituted heterocyclic bicyclic aromatic hydrocarbons, bicyclic or heterocyclic compounds where one ring is aromatic and the other condensed ring is non-aromatic, and their mixtures are disclosed. In a further aspect of this US, patent a binary Rankine cycle power plant is provided in which the condenser of the high temperature and pressure turbine is cooled by a different working fluid which is vaporized thereby and supplied to a low temperature and turbine.

In a fourth preferred embodiment of the present invention, as disclosed in U.S. Pat. No. 6,701,712, the organic fluids of the present invention may be employed in a method and apparatus of producing power wherein heat received from a hot-air clinker process in cement factories is transferred to a heat transfer fluid, e.g. thermal oil in an air-heat transfer fluid heat-exchanger and the heat is used to vaporize organic fluid in a vaporizer for power production using the vaporized working fluid in a turbine.

In a fifth preferred embodiment of the present invention, the organic fluids of the present invention may be employed in a heat recovery method and system thereof according to U.S. Pat. No. 8,671,648, wherein heat emitted from a heat source, such as a gas turbine is transferred to an intermediate fluid, that can be pressurized water, which transfers the heat to an organic working fluid. Vaporized organic fluid produced thereby is then used to drive an organic fluid turbine for producing power by using an electric generator connected to the organic fluid turbine.

In a sixth preferred embodiment of the present invention, the organic fluids of the present invention may be employed in a power plant operating according to gas turbine system disclosed in U.S. Pat. No. 5,687,570. According to this system a water-based, closed loop Rankine cycle power plant is included. Also, according to this system, the steam condenser of the water-based, closed loop Rankine cycle power plant is cooled by organic fluid condensate which is thus pre-heated and then supplied to the organic fluid vaporizer, the organic fluid vapor produced thereby operating an organic vapor turbine. In several embodiments included in this patent, the steam condenser operates as an organic fluid vaporizer.

In a seventh preferred embodiment of the present invention, the organic fluids of the present invention may be employed in a power plant operating on steam according to methods of operation and power production thereof disclosed in U.S. Pat. No. 5,497,624. This system and method includes apparatus for producing power using geothermal fluid such that geothermal steam produces power in a steam turbine, and expanded geothermal steam vaporizes organic fluid for producing additional power in a closed organic Rankine cycle turbine both contained in each of a plurality of integrated power plant unit modules. Furthermore, means for compressing non-condensable gases present in the steam condensers contained in each power plant module can be provided such that the compressed non-condensable gases can be vented into a re-injection well together with pressurized steam condensate produced in the steam condensers. Moreover, geothermal liquid contained in the geothermal fluid can be re-injected into the re-injection well.

In an eighth preferred embodiment of the present invention disclosed in U.S. Pat. No. 4,542,625, the organic fluids of the present invention may be employed in a closed Rankine cycle power plant or unit operating together with a geothermal steam turbine for producing power.

In a ninth preferred embodiment of the present invention, disclosed in U.S. Pat. No. 4,700,549, the organic fluids of the present invention may be employed in a heat recovery cascaded power plant and a method for producing power. The power plant integrates a plurality of independent closed Rankine cycle units operating serially, wherein a law to medium temperature source fluid, such as for example an industrial fluid or geothermal fluid is applied serially to the vaporizer of closed Rankine cycle units producing heat depleted source fluid and the heat depleted source fluid is applied to all of the pre-heaters in parallel wherein a pre-heater is provided for each vaporizer.

In a tenth preferred embodiment of the present invention, disclosed in U.S. Pat. No. 4,578,953, the organic fluids of the present invention may be employed in serially operating integrated closed Rankine cycle power plants, having advantageously a better efficiency in heat recovery and power production. In the serially operating integrated closed Rankine cycle power plants, a low to medium temperature source fluid, such as for example an industrial fluid or geothermal, fluid is applied serially to the vaporizer of closed Rankine cycle units producing heat depleted source fluid and the heat depleted source fluid is applied to all of the pre-heaters in parallel wherein a pre-heater is provided for each vaporizer.

In an eleventh preferred embodiment of the present invention, disclosed in U.S. Pat. No. 4,551,980, the organic fluids of the present invention may be employed in the hybrid power plant disclosed therein. Such a hybrid system is disclosed in Closed Cycle Vapor Turbogenerator—A Reliable Remote Prime Power Source" by N. S. Christopher and J. Gropper, presented at the International Telecommunications Energy Conference in Washington, D.C. October 1982, pages 443-449. The hybrid power plant disclosed in U.S. Pat. No. 4,551,980 includes an intermittently operable non-fuel consuming power generator, such as a photovoltaic cell array, or a wind generator, connected through a control-circuit to a battery for charging the same during operation of the power generator and for supplying current to a time-wise, substantially constant, electrical load. In addition, the hybrid power plant includes an electric generator connected to an intermittently operable prime mover for charging the battery and supplying power to the electrical load when, the prime mover is operated. According to this patent, the prime mover can be a Rankine cycle organic fluid vapor turbogenerator or power unit or power plant employing the Rankine cycle using the organic working fluid including a vaporizer and a burner such as that described in U.S. Pat. No. 3,409,782 and in "Considerations for evaluating, maintaining pipe line coatings", Diane Tracey, PIPE LINE & GAS INDUSTRY, August 1997 and "Two Decades of Security Along TranAlaska Pipeline", Frichtl, W., Pipeline & Gas Journal, July, 1997.

In a twelfth preferred embodiment of the present invention, disclosed in U.S. patent application Ser. No. 10/470,800, now U.S. Pat. No. 6,981,378, the organic fluids of the present invention may be employed in the Rankine cycle turbine included in the uninterruptible power supply and the method for supplying uninterruptible power to a load disclosed therein. This method for supplying interruptible power to a load connected to a power line comprises connecting the power line to a rotatable member comprising a Rankine cycle turbine coupled to device that preferably operates as a motor when line power is applied to the device thereby rotating the member at a standby rotational speed for storing a predetermined amount, of kinetic energy in the rotating member, and that operates as a generator when line power is inoperative, the member being rotated by the application of vaporized working fluid to the turbine. Additionally, the method includes vaporizing working fluid and maintaining the same at an operational temperature level only when the line power is inoperable. Furthermore, the method includes holding working fluid at a standby temperature level while the power line is operative, the standby temperature level preferably being greater than the operational temperature level whereby the working fluid contains a predetermined amount of stored thermal energy while the power line is operative. In addition, the method includes applying the vaporized working fluid to the turbine thereby rotating the rotatable member in response to lose of line power whereby the turbine rotates the member at a nominal speed less than the standby rotational speed. Moreover, the method includes connecting the device to the load whereby power is supplied to the load while the power line is inoperative so that the stored thermal energy in the working fluid and the predetermined amount of kinetic energy are converted to power for the load upon loss of line power. The Rankine cycle turbine disclosed in this US Patent Application is included in a Rankine cycle turbine system which also includes a boiler, a burner, a condenser, a working fluid supply to the bearings including a reservoir for lubricating the bearings, and working fluid cycle pump, e.g. a pitot pump.

In addition, it should be noted that means mentioned in this specification refer to suitable means for carrying out the present invention.

Furthermore, it should be pointed out that the present invention includes as well the method for operating the apparatus disclosed with reference to above-described figures.

All the above description has been provided for the purpose of illustration and is not meant to limit the invention in a way. As will be apparent to a skilled person, the invention can be carried out by using different compounds, all without exceeding the scope of the invention.

All references, patents, applications, tests, standards, documents, publications, brochures, texts, articles, etc. mentioned herein are incorporated by reference. Where a numerical limit or range is stated, the endpoints are included. Also, all values and subranges within a numerical limit or range are specifically included as if explicitly written out.

All the above description and examples have been provided for the purpose of illustration and are not meant to limit the invention in any way. As will be apparent to a skilled person, the invention can be carried out in using different compounds, all without exceeding the scope of the invention.

The invention claimed is:

1. In a heat recovery system including a highly thermally stable working fluid, wherein the improvement comprises a highly thermally stable working fluid suitable for operating in the range of about −50° C. up to 350° C., comprising as the major component at least one compound of formula (I)

$$C_nH_{2n+2} \tag{I}$$

wherein n is between 8 and 20, wherein the compounds of formula (I) have at least three branched methyl groups, and wherein part or all the methyl groups present in said compound are substituted with one or more halogens or halogen containing substituents, wherein said halogens are selected from the group consisting of fluorine, chlorine, and bromine.

2. The heat recovery system according to claim 1, wherein said fluid further comprises an additive selected from the group consisting of fire-retardant agents, flow aids, corrosion inhibitors, lubricants, anti-freezing agents, anti-oxidants, and process oils and mixtures thereof.

3. The heat recovery system of claim 1, wherein said heat recovery system is a heat recovery organic Rankine cycle (ORC) power plant.

4. The heat recovery system of claim 3, wherein said heat recovery system comprises an intermediate fluid, which is said highly thermally stable working fluid and wherein said intermediate fluid transfers heat from a heat source to a further organic working fluid for producing power, and said intermediate fluid is also used for producing power.

5. The heat recovery system of claim 4, wherein both the intermediate fluid and further organic working fluid operate power cycle operating according to the Rankine cycle.

6. A method for waste heat recovery from a power plant, comprising extracting heat from the waste heat source using a power plant comprising the heat recovery system of claim 1.

7. A method for waste heat recovery from waste heat from industrial processes, comprising extracting heat from the waste heat source using a power plant comprising the heat recovery system of claim 1.

8. A method for heat recovery from heat produced by the combustion of conventional fuels, comprising extracting heat produced by the combustion of conventional fuels using a power plant comprising the heat recovery system of claim 1.

9. A method for heat recovery from a geothermal heat source, comprising extracting heat from the geothermal heat source using a power plant comprising the heat recovery system of claim 1.

10. A method for heat recovery from solar radiation, comprising extracting heat from a heat source produced by solar energy using a power plant comprising the heat recovery system of claim 1.

11. In a heat transfer cycle including a highly thermally stable working fluid, wherein the improvement comprises a highly thermally stable working fluid suitable for operating in the range of about −50° C. up to 350° C., comprising as the major component at least one compound of formula (I)

$$C_nH_{2n+2} \tag{I}$$

wherein n is between 8 and 20, wherein the compounds of formula (I) have at least three branched methyl groups, and wherein part or all the methyl groups present in said compound are substituted with one or more halogens or halogen containing substituents, wherein said halogens are selected from the group consisting of fluorine, chlorine, and bromine.

12. The heat transfer cycle according to claim 11, wherein said fluid further comprises an additive selected from the group consisting of fire-retardant agents, flow aids, corrosion inhibitors, lubricants, anti-freezing agents, anti-oxidants, and process oils and mixtures thereof.

13. An organic Rankine cycle power plant comprising a vaporizer for producing organic working fluid vapor, a vapor turbine for expanding said organic working fluid vapor, an electric generator driven by said vapor turbine for producing electrical power, a condenser for condensing expanded organic working fluid vapor exiting said vapor turbine and a pump for supplying the organic working fluid condensate produced by said condenser to said vaporizer, said organic working fluid comprising a highly thermally stable working fluid suitable for operating in the range of about −50° C. up to 350° C., comprising as the major component at least one compound of formula (I):

$$C_nH_{2n+2} \tag{I}$$

wherein n is between 8 and 20, and wherein the compounds of formula (I) have at least three branched methyl groups, and wherein part or all the methyl groups present in said compound are substituted with one or more halogens or halogen containing substituents, wherein said halogens are selected from the group consisting of fluorine, chlorine, and bromine.

14. The organic Rankine cycle power plant according to claim 13, wherein said vaporizer receives heat from power plant waste heat.

15. The organic Rankine cycle power plant according to claim 13, wherein said power plant comprises a heat recovery organic Rankine cycle (ORC) power plant for recovering heat from power plant waste heat.

16. The organic Rankine cycle power plant according to claim 13, wherein said power plant comprises a heat recovery organic Rankine cycle (ORC) power plant for recovering heat from geothermal sources.

17. The organic Rankine cycle power plant according to claim 13, wherein said power plant comprises a heat recovery organic Rankine cycle (ORC) power plant for recovering heat from a heat source produced from solar energy.

18. The organic Rankine cycle power plant according to claim 16, wherein said organic Rankine cycle power plant further comprises a pro-heater for preheating the organic working fluid with geothermal fluid prior to supplying it to said vaporizer.

19. Apparatus for producing power comprising a plurality of organic Rankine cycle power plants according to claim 18, each including a pre-heater and vaporizer wherein said geothermal fluid is applied in series to the vaporizers of said plurality of said organic Rankine cycle power plants producing heat depleted geothermal fluid and the heat depleted geothermal fluid is applied in parallel to the pre-heaters of said plurality of said organic Rankine cycle power plants.

20. The organic Rankine cycle power plant according to claim 16, wherein said organic Rankine cycle power plant operates together with a geothermal steam turbine.

21. The organic Rankine cycle power plant according to claim 20, further including means for re-injecting steam condensate, non-condensable gases and geothermal liquid into a re-injection well.

22. The organic Rankine cycle power plant according to claim 13, further comprising a burner.

23. The organic Rankine cycle power plant according to claim 13, wherein said power plant comprises an intermediate fluid, which is said highly thermally stable working fluid and wherein said intermediate fluid transfers heat from a heat source to a further organic working fluid for producing power, and said intermediate fluid is also used for producing power.

24. The organic Rankine cycle power plant according to claim 23, further comprising a recuperator for heating condensate of said further organic working fluid with further organic working fluid vapor exiting a vapor turbine operated by said further organic working fluid prior to supplying said further organic working fluid vapor exiting said vapor turbine to a further organic working fluid condenser.

25. The organic Rankine cycle power plant according to claim 23, further comprising a further organic vapor turbine for expanding further organic vapor turbine vapor produced from heat transferred from said intermediate fluid and producing power.

26. The organic Rankine cycle power plant according to claim 25, further comprising an electric generator run by said further organic vapor turbine for producing electricity.

27. The organic Rankine cycle power plant according to claim 26, wherein said electric generator is run by both said vapor turbine operated by said intermediate fluid and said further organic vapor turbine.

28. The organic Rankine cycle power plant according to claim 17, wherein said vaporizer is a flash vaporizer supplied with said working fluid heated in a solar trough collector for producing vapor that is supplied to said vapor turbine.

29. The organic Rankine cycle power plant according to claim 13, further comprising a recuperator for heating condensate of said organic working fluid with organic working fluid vapor exiting said vapor turbine prior to supplying said organic working fluid vapor exiting said vapor turbine to said condenser.

* * * * *